United States Patent
Adam et al.

(10) Patent No.: US 10,229,502 B2
(45) Date of Patent: Mar. 12, 2019

(54) TEMPORAL TIME-OF-FLIGHT

(71) Applicant: Microsoft Technology Licensing, LLC, Redmond, WA (US)

(72) Inventors: Amit Adam, Haifa (IL); Sebastian Nowozin, Cambridge (GB); Omer Yair, Haifa (IL); Shai Mazor, Binyamina (IL); Michael Schober, Tuebingen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 15/015,065

(22) Filed: Feb. 3, 2016

(65) Prior Publication Data

US 2017/0221212 A1 Aug. 3, 2017

(51) Int. Cl.
| | |
|---|---|
| *G06T 7/00* | (2017.01) |
| *G01S 17/50* | (2006.01) |
| *G01S 17/89* | (2006.01) |
| *G01S 7/48* | (2006.01) |
| *G06F 3/01* | (2006.01) |
| *G06K 9/00* | (2006.01) |
| *G06T 7/55* | (2017.01) |

(52) U.S. Cl.
CPC .......... *G06T 7/0065* (2013.01); *G01S 7/4808* (2013.01); *G01S 17/50* (2013.01); *G01S 17/89* (2013.01); *G06F 3/017* (2013.01); *G06K 9/00201* (2013.01); *G06T 7/55* (2017.01); *G06T 2207/10016* (2013.01); *G06T 2207/10028* (2013.01); *G06T 2207/30241* (2013.01)

(58) Field of Classification Search
None
See application file for complete search history.

(56) References Cited

U.S. PATENT DOCUMENTS

| 8,031,906 B2 | 10/2011 | Fujimura et al. |
| 8,711,206 B2 | 4/2014 | Newcombe et al. |
| 9,092,875 B2 | 7/2015 | Yamada et al. |
| 9,134,114 B2 * | 9/2015 | Metz ....................... G01S 17/89 |

(Continued)

FOREIGN PATENT DOCUMENTS

| WO | 2015057098 A1 | 4/2015 |
| WO | 2015097284 A1 | 7/2015 |

OTHER PUBLICATIONS

Zhu, et al., "Fusion of Time-of-Flight Depth and Stereo for High Accuracy Depth Maps", In Proceedings of IEEE Computer Society Conference on Computer Vision and Pattern Recognition, Jun. 24, 2008, pp. 1-8.

(Continued)

*Primary Examiner* — Kate H Luo

(57) ABSTRACT

A depth detection apparatus is described which has a memory and a computation logic. The memory stores frames of raw time-of-flight sensor data received from a time-of-flight sensor, the frames having been captured by a time-of-flight camera in the presence of motion such that different ones of the frames were captured using different locations of the camera and/or with different locations of an object in a scene depicted in the frames. The computation logic has functionality to compute a plurality of depth maps from the stream of frames, whereby each frame of raw time-of-flight sensor data contributes to more than one depth map.

20 Claims, 10 Drawing Sheets

(56) References Cited

U.S. PATENT DOCUMENTS

| | | | |
|---|---|---|---|
| 2010/0034427 A1* | 2/2010 | Fujimura | G06K 9/00201 |
| | | | 382/106 |
| 2010/0295783 A1 | 11/2010 | El Dokor et al. | |
| 2012/0098935 A1 | 4/2012 | Schmidt et al. | |
| 2012/0106803 A1 | 5/2012 | Lee et al. | |
| 2014/0009650 A1 | 1/2014 | Kim et al. | |
| 2014/0139639 A1* | 5/2014 | Wagner | H04N 13/0253 |
| | | | 348/46 |
| 2014/0168369 A1 | 6/2014 | Crane et al. | |
| 2014/0253688 A1* | 9/2014 | Metz | G01S 17/89 |
| | | | 348/46 |
| 2014/0299775 A1 | 10/2014 | Kimmel | |
| 2014/0300701 A1 | 10/2014 | Park et al. | |
| 2015/0049169 A1 | 2/2015 | Krig et al. | |
| 2015/0248765 A1 | 9/2015 | Criminisi et al. | |

OTHER PUBLICATIONS

Foix, et al., "Lock-in Time-of-Flight (ToF) Cameras: A Survey", In IEEE Sensors Journal, vol. 11, Issue 3, Mar. 2011, pp. 1-11.

Hui, et al., "Motion-Depth: RGB-D Depth Map Enhancement with Motion and Depth in Complement", In Proceedings of Conference on Computer Vision and Pattern Recognition, Jun. 23, 2014, pp. 4321-4328.

"International Search Report and Written Opinion Issued in PCT Application No. PCT/US2017/015695", dated May 8, 2017, 14 Pages.

* cited by examiner

TEMPORAL TIME-OF-FLIGHT

BACKGROUND

Time-of-flight (TOF) cameras are increasingly used in a variety of applications, for example, human computer interaction, automotive applications, measurement applications and machine vision. A TOF camera can be used to compute depth maps which contain information relating to the depth of an object in a scene from the camera. The depth refers to the projection of distance on an imaginary line that extends from the camera, where the distance is the absolute radial distance. A light source at the TOF camera illuminates the scene and the light is reflected by objects in the scene. The camera receives the reflected light that, dependent on the distance of an object to the camera, experiences a delay. Given the fact that the speed of light is known, a depth map may be computed.

The embodiments described below are not limited to implementations which solve any or all of the disadvantages of known TOF cameras or TOF image processing systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A depth detection apparatus is described which has a memory and a computation logic. The memory stores frames of raw time-of-flight sensor data received from a time-of-flight sensor, the frames having been captured by a time-of-flight camera in the presence of motion such that different ones of the frames were captured using different locations of the camera and/or with different locations of an object in a scene depicted in the frames. The computation logic has functionality to compute a plurality of depth maps from the stream of frames, whereby each frame of raw time-of-flight sensor data contributes to more than one depth map.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Time-of-flight cameras are able to compute depth maps from raw time-of-flight data which they sense. This is described below in more detail with reference to FIG. 9. Existing time-of-flight cameras (referred to herein as static time-of-flight cameras) do not take into account temporal data; that is, existing time-of-flight cameras compute depth maps from raw sensor data captured during a time in which the camera and/or scene is assumed to be static and where previous frames of raw sensor data are discarded. It is found that by using temporal time-of-flight data more accurate depth maps are computed than when static time-of-flight is used. In temporal time-of-flight, data from a single raw time-of-flight frame contributes to more than one depth map where appropriate. The ability to have this contribution, where appropriate, enables improved accuracy of the depth maps. Empirical testing of a temporal time-of-flight system is described herein and shows improved accuracy, even compared with a baseline approach, where depth maps computed using a static time-of-flight system, are averaged over time.

Previous time-of-flight depth cameras typically use the same measurement pattern to capture frames of raw sensor data. A measurement patterns is a set of values of configurable parameters of the time-of-flight camera such as exposure period, frequency of emitted light, amplitude of emitted light, phase shift of emitted light, intensity of emitted light, wavelength of emitted light and others. In various examples described herein, different measurement patterns are used for different frames of raw sensor data and this is found to give improved accuracy of depth maps in the case of temporal time-of-flight, as compared with using the same measurement pattern.

Figure 1:
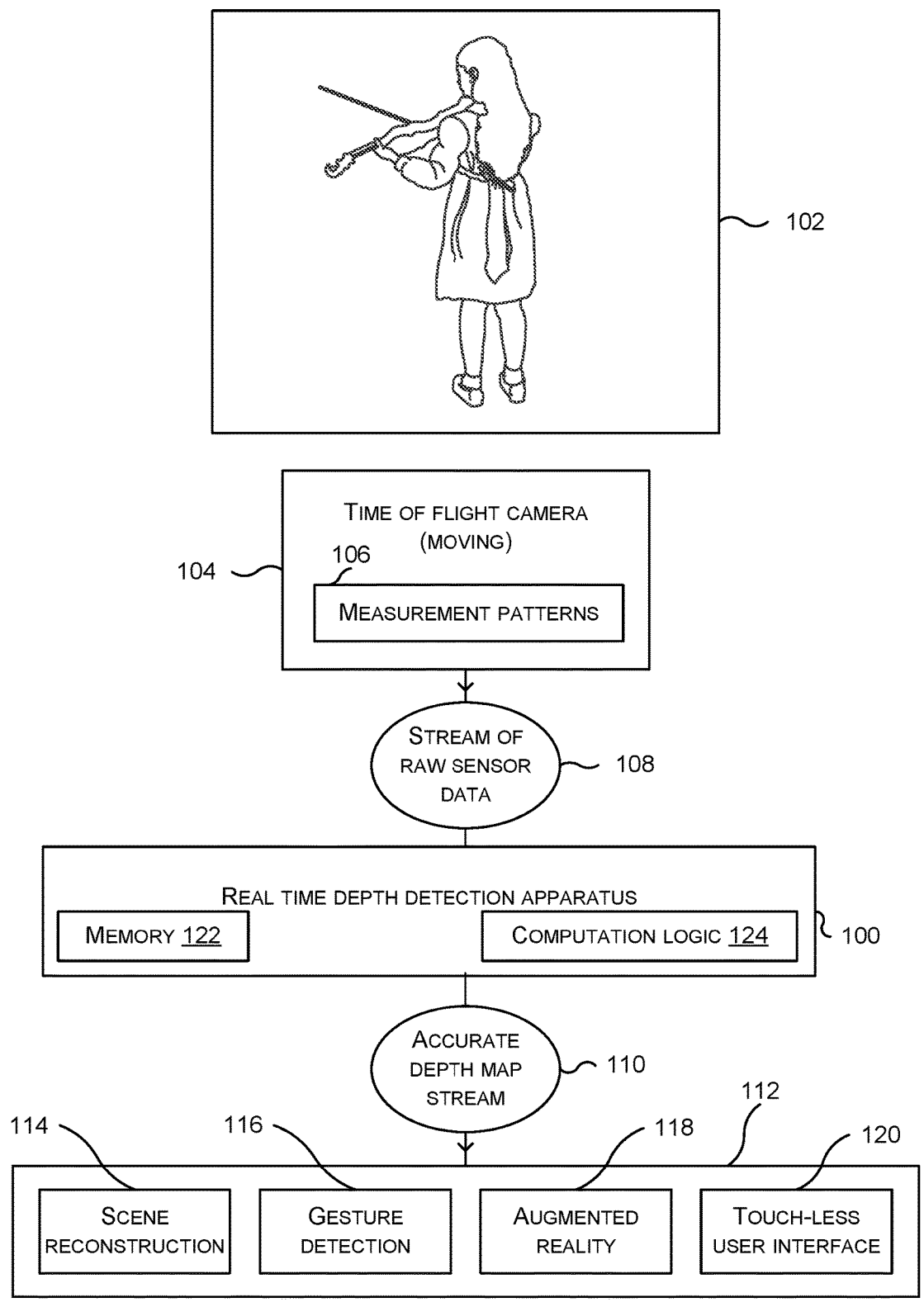
FIG. 1 is a schematic diagram of a depth detection apparatus using temporal time-of-flight.

FIG. 1 is a schematic diagram of a depth detection apparatus using temporal time-of-flight. A time-of-flight camera 104, which is a phase modulation time-of-flight depth camera or a gated time-of-flight depth camera, captures a stream of raw sensor data 108 depicting a scene 102. One or more objects in the scene 102 and/or the time-of-flight camera itself are moving in some examples. For example, in the scenario of FIG. 1 the scene comprises a child playing the violin so that there are several moving objects in the scene (the violin bow, the child's arm, the child's fingers). The time-of-flight camera is wall-mounted in the room or in some examples is body worn or head-mounted.

The stream of raw sensor data 108 comprises a plurality of frames of raw sensor data which have been captured by the time-of-flight camera. For example, for some types of time-of-flight camera a frame of raw sensor data comprises, for each pixel of the camera sensor, complex numbers which are amplitude and phase measurements of reflected light. For example, for another type of time-of-flight camera, a frame of raw sensor data comprises, for each pixel of the camera sensor, an intensity value of reflected light sensed at the pixel, for a given exposure period.

In some examples, the time-of-flight camera uses a plurality of different measurement patterns 106. As mentioned above, a measurement pattern is a set of values of configurable parameters of the time-of-flight camera, to be used when a frame of raw sensor data is captured by the camera. Where different measurement patterns 106 are available, the time-of-flight camera is able to capture different frames using different measurement patterns. For example, an optimal sequence of measurement patterns to be used is specified as described below with reference to FIGS. 5 and 7.

The stream of raw sensor data 108 is input to a depth detection apparatus 100 which computes depth maps using temporal time-of-flight (and optionally also static time-of-flight) so that an accurate depth map stream 110 is output. The depth map stream 110 is input to a downstream system 112 such as a scene reconstruction engine 114, a gesture detection system 116, an augmented reality system 118, a touch-less user interface 120 or others.

The depth detection apparatus 100, which operates in real-time in some examples, comprises at least a memory 122 and a computation logic 124. For example, the depth detection apparatus 100 is integral with the time-of-flight camera 104, or is in a computing device such as a smart phone, tablet computer or other computing device which has a time-of-flight camera. The memory 122 holds raw time-of-flight sensor data from the stream 108 and makes this available to the computation logic 124 for processing. The computation logic 124 is based on a model of temporal time-of-flight and optionally also a model of static time-of-flight. That is, in some examples, the computation logic 124 comprises a trained regressor which approximates, or is a working equivalent of, a model of temporal time-of-flight, but which is operable in real time and/or using resource constrained hardware such as a smart phone. In some examples the computation logic 124 has a second trained regressor which approximates a model of static time-of-flight although this is not essential. A single trained regressor or look up table is used in some examples to approximate a model of time-of-flight which takes into account both temporal and static time-of-flight.

In some examples the computation logic 124 comprises the time-of-flight model itself (rather than an efficient regressor which approximates the model) and has functionality to make inferences using the model.

A model of time-of-flight is a description of a relationship between raw time-of-flight data and imaging conditions. In some examples the model is a probabilistic model, which is a description expressed using likelihoods. Using a probabilistic model gives the ability to reason about uncertainty. In some examples the model is a generative model which is a description of how raw time-of-flight data is generated given imaging conditions. The model of time-of-flight takes into account temporal time-of-flight which includes taking into account frames of raw time-of-flight data over time.

In the examples described herein the model is a probabilistic generative model of temporal time-of-flight. However, it is also possible to use a model of temporal time-of-flight which is not probabilistic, or which is not generative.

A probabilistic generative model of time-of-flight is a description, expressed using likelihoods, of how raw time-of-flight data is generated by a time-of-flight camera under specified imaging conditions comprising reflectivity of a surface generating reflected light received at the camera (also referred to as albedo), illumination of the surface, and depth of the surface from the camera. Where the probabilistic generative model is of temporal time-of-flight the description additionally includes how imaging conditions at individual pixels evolve over time. This is referred to as a motion model component of the probabilistic generative model. The part of the probabilistic generative model which describes how raw time-of-flight data is generated under the imaging conditions is referred to as an observation model component of the probabilistic generative model. Detailed examples of probabilistic generative models of time-of-flight are given later in this document.

Figure 2:
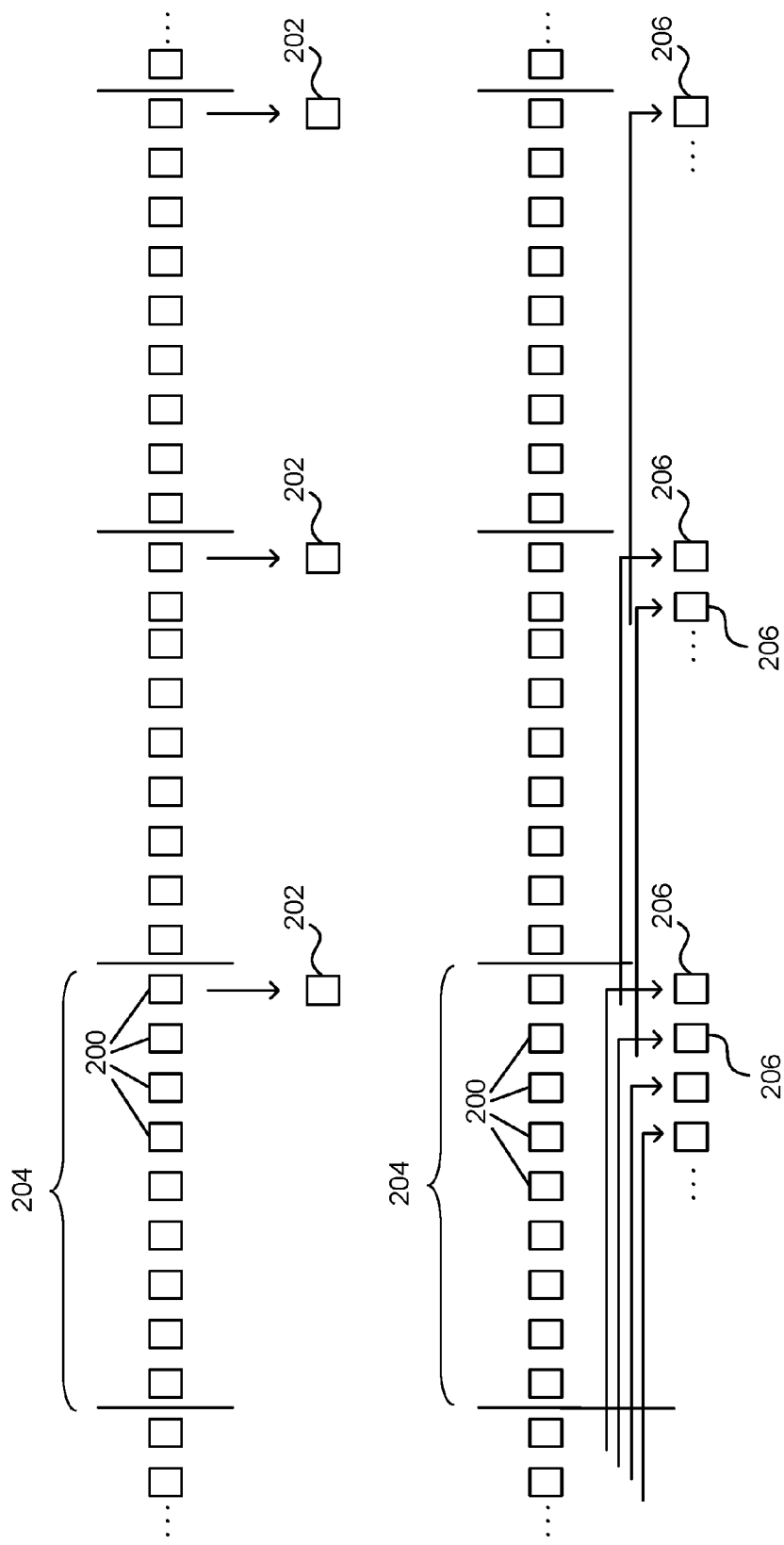
FIG. 2 is a schematic diagram of two streams of frames of raw time-of-flight data and showing, for one of the streams, how each frame of raw time-of-flight sensor data contributes to more than one depth map.

Explanation of temporal time-of-flight and static time-of-flight is now given with respect to FIG. 2. FIG. 2 is a schematic diagram of two streams of frames of raw time-of-flight data and showing, for one of the streams, how each frame of raw time-of-flight sensor data contributes to more than one depth map. A first stream of frames of raw time-of-flight data is shown in the upper part of FIG. 2 by a row of rectangles, each rectangle 200 depicting a single frame of raw time-of-flight data. The stream is divided into blocks of nine frames 204 and the nine frames 204 in a block contribute to a single depth map 202. This first stream of frames of raw time-of-flight data illustrates operation of a static time-of-flight camera, in which each frame of raw time-of-flight data contributes to only one depth map 202. The example in FIG. 2 shows blocks of nine frames 204, however other numbers of frames per block are used in other examples. For example, about three to twenty frames per block are used.

FIG. 2 shows a second stream of frames of raw time-of-flight data in the lower part by a row of rectangles, each rectangle 200 depicting a single frame of raw time-of-flight data and with temporal time-of-flight being used. As for the first stream, the second stream is divided into blocks of nine frames 204. However, a depth map 206 is formed using data from nine frames 204 and from a tenth frame, which is the first frame of a previous block. More than one depth map 206 is formed in this way so that up to nine depth maps are formed for a given block of frames 204. In contrast, in the static time-of-flight scenario of the upper part of FIG. 2 only one depth map is computed per block. In the temporal time-of-flight situation, each frame 200 is able to contribute to more than one depth map 206.

In some examples described herein the depth detection apparatus uses a mixture of the temporal and static time-of-flight scenarios to describe the data, and dynamically adjusts the relative influence of the temporal and static time-of-flight according to the observed data and/or past experience.

Figure 3:
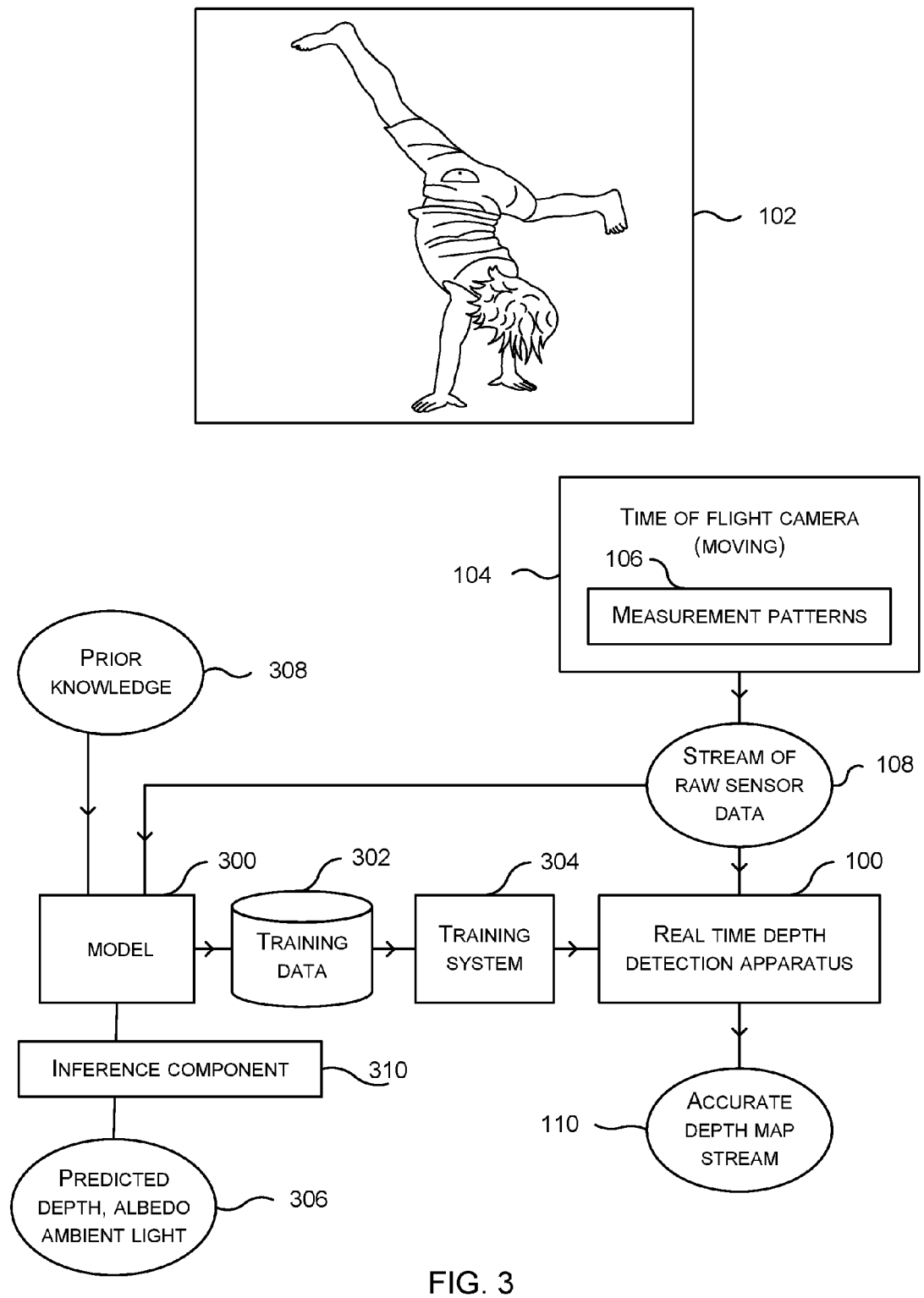
FIG. 3 is a schematic diagram of the depth detection apparatus of FIG. 1 and also showing a model, training data and a training system.
Figure 4:
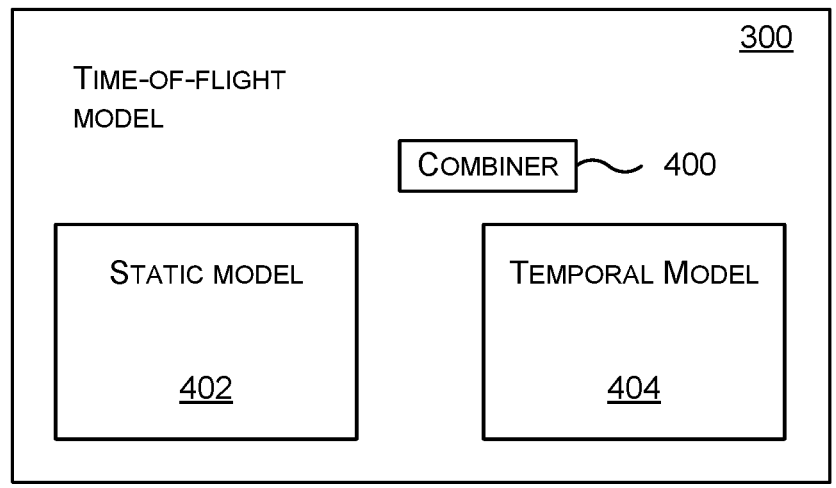
FIG. 4 is a schematic diagram of a model of temporal time-of-flight.

FIG. 3 is a schematic diagram of the depth detection apparatus of FIG. 1 and also showing a model 300 of temporal time-of-flight, training data 302 and a training system 304. As mentioned above the model 300 of temporal time-of-flight describes the relationship between raw sensor data observed over time and imaging conditions over time, where the camera and/or objects in the scene may move during the time. Given the stream of raw sensor data 108, the model 300, and prior knowledge about the imaging conditions and/or sensor data, it is possible to infer imaging conditions (including depth, albedo, ambient light) associated with the raw sensor data 108. Given known imaging conditions it is also possible to infer corresponding synthetic raw sensor data. An inference component 310 is used to carry out the inference. For example, the inference component 310 carries out any one or more of: importance sampling, Markov chain Monte Carlo sampling.

Using the inferred data, training data 302 is formed. The training data comprises pairs each pair comprising a depth value and a corresponding raw sensor data value. A training system 304 uses the training data 302 to train the computation logic of the depth detection apparatus 100. In this way the computation logic, once trained, has functionality which is a working equivalent of the model 300 of temporal time-of-flight, but which is able to operate in real time and/or to operate on a resource constrained device such as a smart phone. For example, the training system 304 trains a regressor such as a neural network, regression tree, or other regressor. For example, the training system 304 populates a multi-dimensional look up table which is used to look up depth values given camera response vectors for a series of frames.

As mentioned above, in some examples, the depth detection apparatus uses a mixture of the temporal and static time-of-flight scenarios to describe the data, and dynamically adjusts the relative influence of the temporal and static time-of-flight according to the observed data and/or past experience. For example, the model 300 comprises a static model 402 of static time-of-flight, and a temporal model 404 of temporal time-of-flight. The static and temporal models are combined using combiner 400 so that their influence relative to one another is adjusted dynamically according to the circumstances. The manner in which the combiner does this is specified by the motion model component of the model as now described for one example in which probabilistic models are used.

In an example, the combiner 400 selects a value between zero and 1 of a mixture weight $w \in [0,1]$ which is used in the following motion model for temporal time of flight:

$$P(\vec{\theta}^{(s+1)} | \vec{\theta}^{(s)}) = wP(\vec{\theta}^{(s+1)}) + (1-w)Q(\vec{\theta}^{(s+1)} | \vec{\theta}^{(s)})$$

Which is expressed in words as:

the probability of the imaging conditions of the next frame, given the imaging conditions of the current frame, is equal to a mixture weight times the prior probability of the imaging conditions of the next frame using a static model, plus one minus the mixture weight times the temporal prior probability from a temporal model of the imaging parameters of the next frame given the imaging parameters of the current frame.

In some examples, the mixture weight w is a static scalar set by an operator in advance. The combiner 400 aggregates the static model 402 with the temporal model 404 into a joint model. For example, by aggregating likelihood function of the static model 402 with the temporal model 404 into a joint probabilistic model. By using the mixture weight w robustness is achieved. This is because if two frames (of raw sensor data) differ sufficiently strongly, then the depth detection component falls back on the static model, explaining each frame of raw sensor data separately. Otherwise, if temporal assumptions are too strong they override evidence present in the observation likelihood leading to systematic bias, drift, or in the case of tracking, being stuck in the background. The mixture weight w is not affected by the observed data. However, when inference is carried out the observed data, R, enters through the likelihood function over multiple time steps and this automatically selects (in a soft probabilistic way) which component of the temporal prior is used to explain the observation.

The prior temporal probability from a temporal model of the imaging parameters of the next frame given the imaging parameters of the current frame is specified through one of multiple means. First, it may be deduced, or specified from beliefs about the presence of motion and changes of imaging conditions. For example, prior knowledge about depth is specified as a uniform distribution in some examples, so as not to prefer one depth over another. Second, it may be obtained empirically as now described. It is also possible to use mixtures of these two approaches (empirical and non-empirical) to specify the prior.

An example of how to obtain the prior temporal probability empirically is now given.

A plurality of typical camera trajectories are observed and six-dimensional camera motion vectors recorded for each trajectory. Normal, or other statistical distributions, are approximately fitted to the change in camera translation and rotation such that these have a mean change of zero. The standard deviations of the statistical distributions are calculated and stored for use as the empirical prior data. This gives a simplified empirical model of how the camera is translated and rotated between pairs of adjacent frames, referred to here as a motion model.

Empirical data about scene geometry is obtained using a rendering simulation. A plurality of different scenes (such as real scenes of living rooms, kitchens, offices, and other rooms) are selected and used with the model of how the camera is translated and rotated between pairs of frames, to randomly sample pairs of frames with simulated camera motion. This gives pairs of ground truth depth maps, each with ground truth albedo and ambient light. These pairs of ground truth depth maps are used to estimate $Q(\vec{\theta}^{(s+1)} | \vec{\theta}^{(s)})$ which is the prior probability from a temporal model, of the imaging parameters of the next frame given the imaging parameters of the current frame.

The pairs of ground truth depth maps are used to generate histograms of the change in imaging conditions, such as a histogram showing how often different amounts of change of depth were observed between images of a pair, a histogram of how often different amounts of change of reflectivity (or albedo) were observed between images of a pair, a histogram of how often different amounts of change of ambient illumination were observed between images of a pair. In order to generalize beyond the different observed scenes and to describe the histograms succinctly for efficient storage and look up, statistical distributions are approximately fitted to the histograms, using Laplace distributions or other forms of distribution. Statistics of the distributions (such as mean and standard deviation) are then stored and are prior knowledge about the imaging conditions of the next frame given the current frame.

The motion model described above is used together with an observation model which describes how the observed raw time of flight data relates to imaging conditions. The observation model and the motion model together form the model of temporal time of flight. The observation model takes into account single path reflections only, or two path reflections, more than two path reflections, or general Lambertian diffuse reflections. An example of an observation model is $P(\vec{R} | \vec{\theta})$ that for each pixel relates unknown imaging conditions denoted by the symbol $\vec{\theta}$ to an observed response vector denoted by the symbol $\vec{R}$. The observation model takes into account different types of noise.

As mentioned above inference component 310 carries out inference on the model of temporal time-of-flight. In order to give a working inference component 310 which operates in practical time scales, the model is limited to a small number of the most recent S frames of raw time-of-flight data. This assumes that the influence of past observations decays quickly enough with time such that after S frames it is possible ignore the old measurements. In this case the posterior distribution of imaging conditions given observations of temporal time-of-flight becomes $$P(\vec{\theta}^{(1:S)}|\vec{R}^{(1:S)}) \propto P(\vec{\theta}^{(1:S)},\vec{R}^{(1:S)})$$

Which is expressed in words as the probability of imaging conditions present for each of S frames, given raw response vectors of each of the S frames is proportional to the probability of the imaging conditions of the S frames and the raw response vectors of each of the S frames occurring together.

Inference using the above model is achieved using approximate inference methods for probabilistic models, such as importance sampling or Markov chain Montel Carlo sampling which is fast enough to perform offline computation but not for realtime depth estimates.

For a plurality of frames S, samples of the imaging conditions and/or the raw sensor data are obtained from the empirical prior 308 and the inference component 310 operates to compute corresponding depth estimates (which are part of the imaging conditions). This generates pairs of: sets of imaging conditions for a plurality of frames S, and corresponding depth estimates. These pairs form training data 302. Several tens of millions of training data pairs are obtained in this way and used by a training system 304 to train the computation logic of the depth detection apparatus 100. For example, by training a least squares regression tree model on a quadratic feature expansion of the raw sensor data for the frames S to predict a scalar value representing the depth. Using a regression tree has been found to scale well with the number frames S. Using a regression tree gives a mechanism suitable for mobile devices where efficient hardware implementations are used for the regression tree. However, it is not essential to use a regression tree. Other options include neural networks, look up tables, other types of regressor.

At runtime a response vector is observed for each pixel, where the vector has entries for each frame S, and the trained regression tree is evaluated using the response vector to estimate depth.

Figure 5:
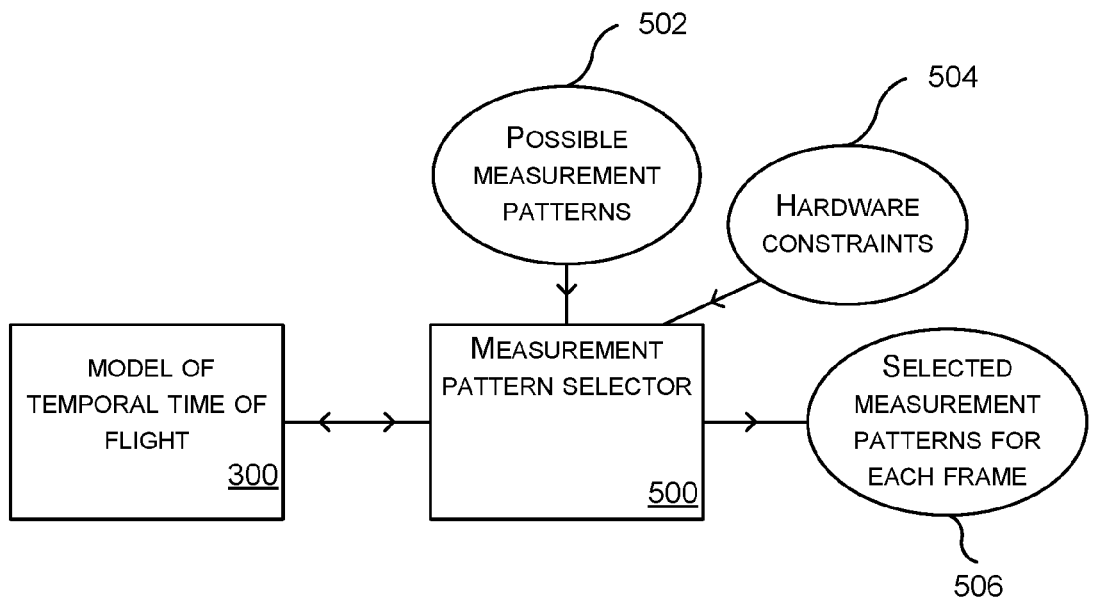
FIG. 5 is a schematic diagram of a measurement pattern selector.

FIG. 5 is a schematic diagram of a measurement pattern selector 500 which is optionally used to select a sequence of measurement patterns to be used by the time-of-flight camera. The measurement pattern selector 500 obtains possible measurement patterns 502 potentially available to the time-of-flight camera, and applies any known hardware constraints 504 to these. The measurement pattern selector then searches the constrained space of possible measurement patterns to find a sequence of measurement patterns which is best according to an assessment metric as described in more detail below with reference to FIG. 7. To calculate the assessment metric involves using the model of temporal time of flight 300 and an inference component 310 (see FIG. 3) to predict depth values. The search is carried out using a simulated annealing optimization in some examples.

Figure 6:
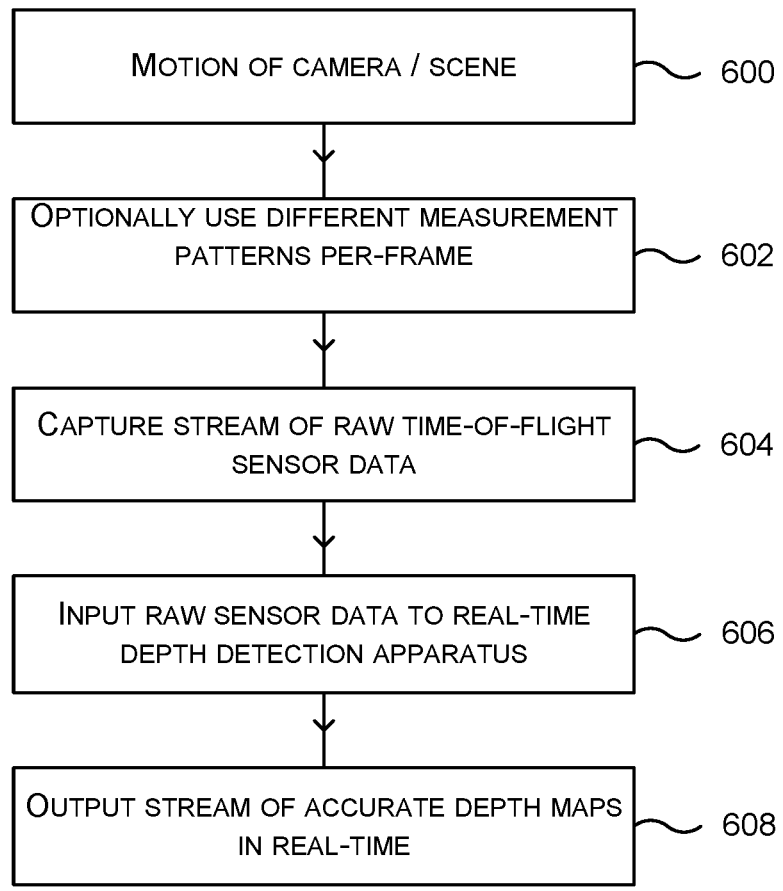
FIG. 6 is a flow diagram of a method at the depth detection apparatus of FIGS. 1 and 3.

FIG. 6 is a flow diagram of a method of operation at the real-time depth detection apparatus 100 of FIG. 1 of FIG. 3. Motion 600 of a time-of-flight camera and/or of objects in a scene being observed by the time-of-flight camera optionally occurs. The time-of-flight camera optionally uses 602 different measurement patterns per frame and captures 604 frames of raw time-of-flight sensor data. For example, the measurement patterns are specified in a sequence which is cyclical. The frames of raw sensor data are input 606 to a real-time depth detection apparatus 100 which uses a trained regressor for a temporal time-of-flight model.

The real time depth detection apparatus 100 outputs 608 a stream of accurate depth maps in real-time. Each frame of raw sensor data contributes to more than one depth map.

Figure 7:
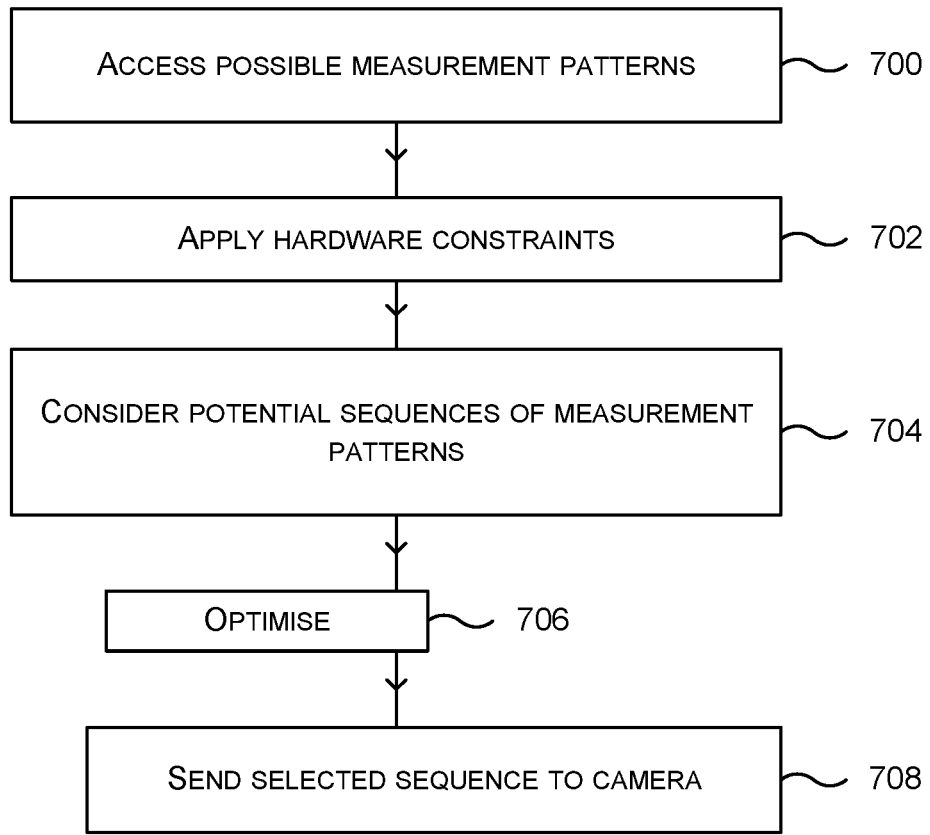
FIG. 7 is a flow diagram of a method at the measurement pattern selector of FIG. 5.

FIG. 7 is a flow diagram of a method of operation at the measurement pattern selector 500 of FIG. 5. Possible measurement patterns are accessed 700 and hardware constraints are applied 702 to limit the number of possible measurement patterns. Potential sequences of measurement patterns are considered 704 by optimizing 706 over the measurement pattern sequences, an objective function which expresses an average error where the average error is computed by taking into account the temporal time-of-flight model.

The optimization 706 finds an optimal or local optimum measurement pattern sequence. The optimal or local optimum measurement pattern sequence is sent 708 to the camera or configured at the camera.

It is found that using a temporal time-of-flight model as described with reference to FIG. 1 gives improved depth accuracy as compared with using a static time-of-flight model and also as compared with averaging two or more depth maps associated with different times. The following table has empirical results obtained from testing depth accuracy of six different probabilistic generative models of time of flight. The best accuracy is observed for the dynamic two path model, which is the situation where the probabilistic generative model takes into account two frames of raw time-of-flight data (S=2 in the equations above) with camera and/or scene motion, and taking into account two paths by which reflected light reaches each pixel.

The results in the table below were obtained by using each of the models to infer depth for known situations (where ground truth depth values are known). The inferred depth values were then compared with the known ground truth depth values to obtain the errors in centimeters of depth.

The static single path model, is for the case where the probabilistic generative model takes into account one frame of raw time-of-flight data (S=1 in the equations above), with no camera and/or scene motion, and taking into account only one path by which reflected light reaches each pixel. The static two path model is the same as for the static single path model, but taking into account two paths by which reflected light reaches each pixel.

The baseline single path model, is for the case where the static single path model generates depth maps associated with different times, and depth values are averaged over the depth maps. The baseline two path model is the same as for the baseline single path model, but taking into account two possible paths by which reflected light reaches each pixel.

The dynamic single path model is the same as for the dynamic two path model, but taking into account only single paths by which reflected light reaches each pixel.

| Model | 25% Absolute error quantile (centimeters) | 50% Absolute error quantile (centimeters) | 75% Absolute error quantile (centimeters) |
|---|---|---|---|
| Static single path | 3.57 | 9.20 | 23.29 |
| Baseline single path | 4.21 | 9.90 | 21.50 |
| Dynamic single path | 3.28 | 7.78 | 16.82 |
| Static two path | 2.55 | 6.79 | 21.70 |
| Baseline two path | 2.87 | 7.26 | 18.69 |
| Dynamic two path | 2.56 | 6.16 | 14.48 |

It can be seen from the table of results above that the models using two paths for the reflected light perform better than their single path counterparts in all settings. Also, the dynamic two path model performs best indicating that taking into account raw time-of-flight frames captured at different times, and using a motion model of the camera and/or scene, gives improved accuracy as compared with the static or the baseline models. In particular, this shows how the temporal time-of-flight gives better accuracy than previous approaches using averaging of depth maps, those depth maps being derived from raw time-of-flight sensor data.

Figure 8:
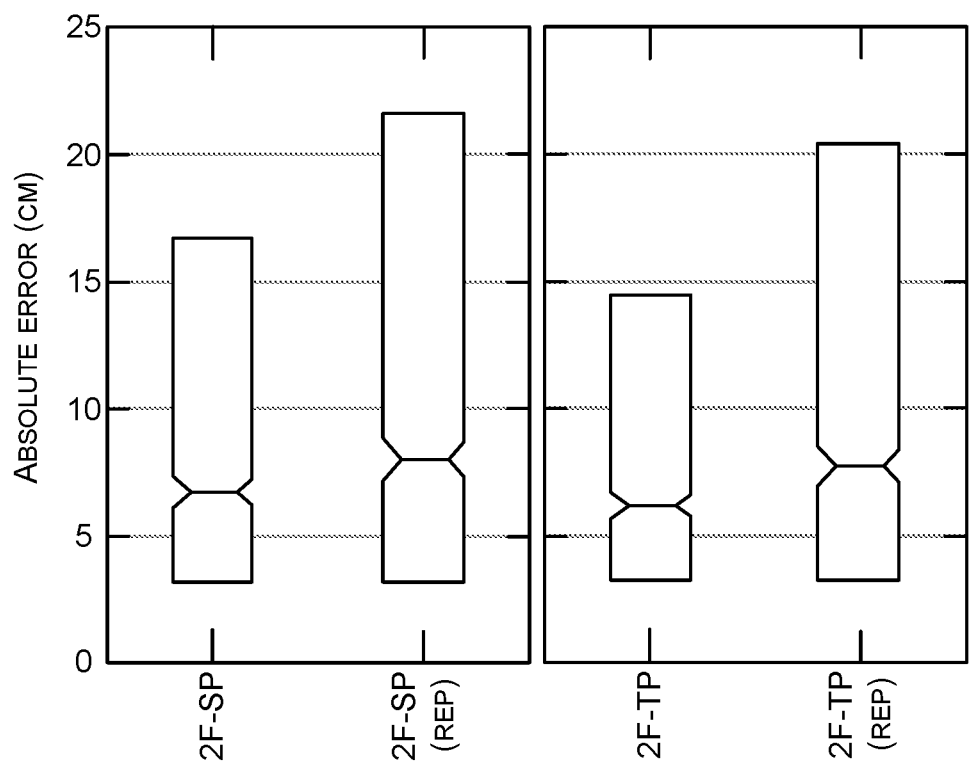
FIG. 8 is a box plot of absolute depth error in centimeters for a depth detection apparatus using static or temporal time-of-flight, and for a single path or a multi-path scenario.

FIG. 8 is a box plot of empirical absolute depth error results in centimeters for a depth detection apparatus (such as that of FIG. 1 or FIG. 3) using temporal time-of-flight and either with the same measurement pattern, or different measurement patterns. It shows how using different measurement patterns gives improved depth accuracy.

In this box plot, the top of each box indicates the 75% quantile error, the "waist" of each box indicates the median value, and the bottom of each box indicates the 25% quantile error. The box labelled 2F-SP represents results for the single path model, using temporal time-of-flight over two frames (S=2 in the equations above), and with two different measurement patterns one for each frame. The box labelled 2F-SP(rep) represents results for the single path model, using temporal time-of-flight over 2 frames (S=2 in the equations above), and with the same two measurement patterns. The box labelled 2F-TP represents results for the two path model, using temporal time-of-flight over two frames (S=2 in the equations above), and with two different measurement patterns. The box labelled 2F-TP (rep) represents results for the two path model, using temporal time-of-flight over two frames (S=2 in the equations above), and with the same measurement pattern for each frame.

The results in FIG. 8 were obtained by simulating a plurality of sets of imaging condition values from the empirical prior (including ground truth depth values) and creating two sets of response vectors by using the probabilistic generative model, one for the case where the measurement patterns differ, and one for the case where the measurement patterns are the same. In the case of different measurement patterns, these were selected using the measurement pattern selector as described above. Posterior inference was performed using the models mentioned in FIG. 8 and the resulting depth values compared against the known ground truth depth values to obtain error values in centimeters.

Figure 9:
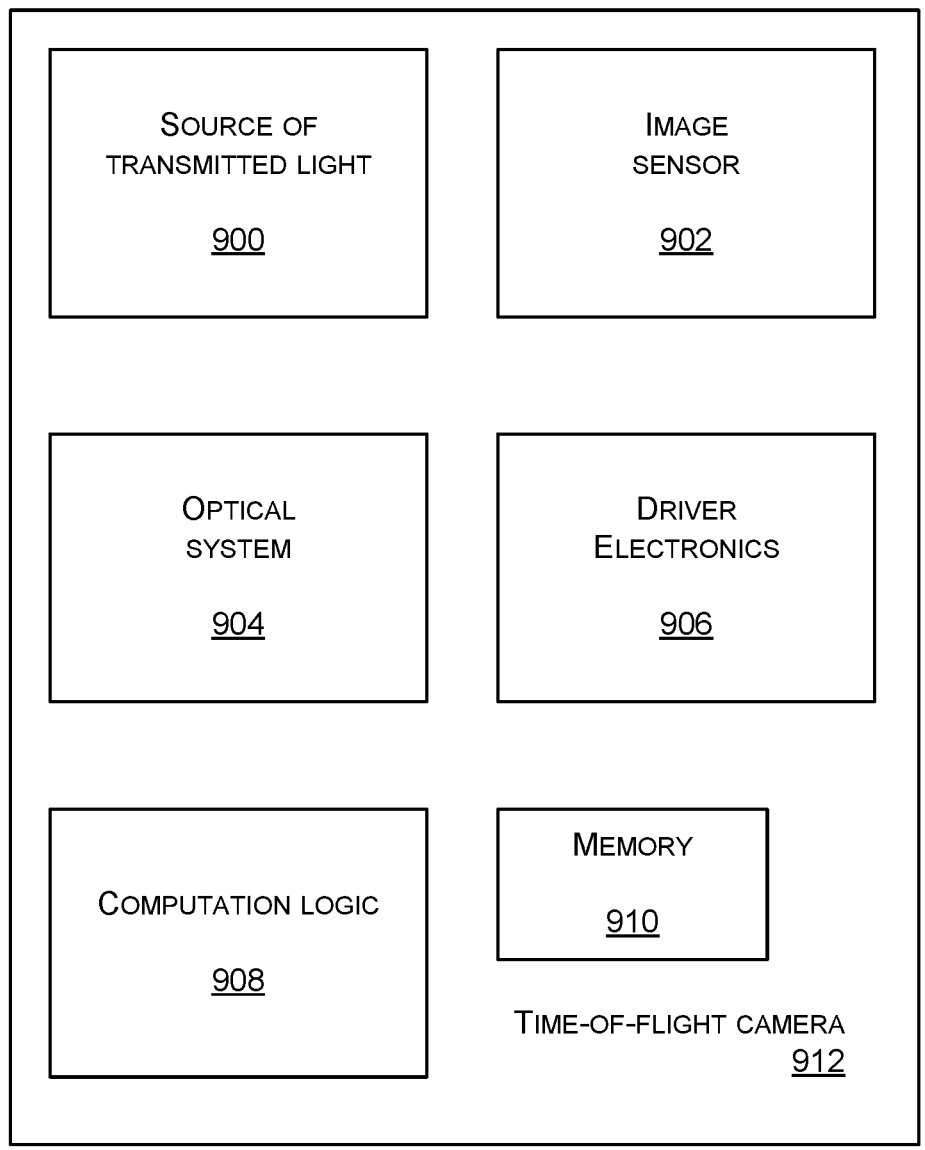
FIG. 9 is a schematic diagram of a time-of-flight camera with a computation logic for temporal time-of-flight.

FIG. 9 is a schematic diagram of a time-of-flight depth camera 900 which may be a phase modulation time of flight depth camera or a gated time of flight depth. The time of flight camera 900 comprises a source of transmitted light 902. In an example the source of transmitted light is an incoherent light source. In another example the source of transmitted light is a coherent light source. An example of an appropriate light source is a near infra-red laser or LED however another appropriate light source may be used. In the case of a phase modulated time of flight camera the transmitted light may be modulated at a modulation frequency. In an example the modulation frequency may be an RF frequency in the range kHz-GHz, for example the modulation frequency may be in the MHz range. In the case of a gated time-of-flight camera the transmitted light may be pulsed where the pulses may be of picosecond duration.

A time-of-flight depth camera comprises an image sensor 604 that receives light reflected from objects within the scene. The image sensor 604 may comprise a charge-coupled device (CCD) sensor, a complementary metal-oxide-semiconductor (CMOS) sensor, for example a Photonic Mixer Device (PMD) sensor or other appropriate sensor which may be arranged to detect light reflected from objects, people and surfaces within the camera range. In the case of a gated time of flight camera the image sensor 904 has a resolution compatible with the duration of the pulses emitted by the light source.

The camera comprises an optical system 906 that is arranged to gather and focus reflected light from the environment on to the image sensor 904. In an example the optical system may comprise an optical band pass filter, which may enable only light of the same wavelength as the light source to be received by the sensor. The use of an optical band pass filter helps to suppress background light. The camera comprises driver electronics 908 which control both the light source and an image sensor, for example, to enable highly accurate phase difference measurements to be made or to enable a train of light pulses to be emitted and for the image sensor to be "shuttered" on and off. An image sensor may be shuttered on and off electronically rather than with physical shutters.

In one example the camera comprises computation logic 910. In an embodiment computation logic may be arranged to execute the methods described herein with respect to FIG. 6 in order to compute depth maps in real time from a stream of raw time-of-flight data and using temporal information. The camera has memory 910 which stores raw time-of-flight data, depth maps and other data.

Alternatively, or in addition, the functionality of FIG. 9 can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 10:
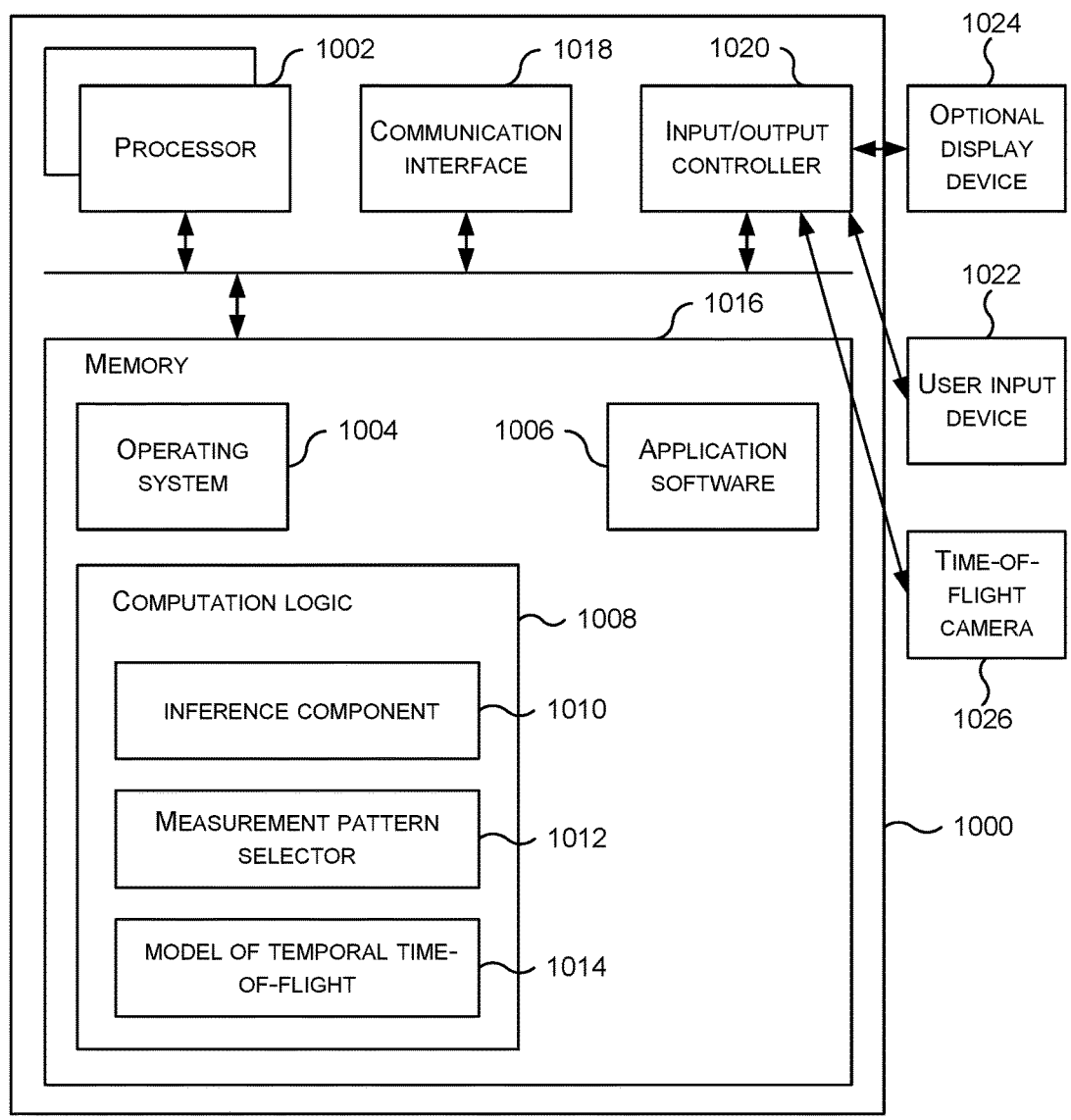
FIG. 10 illustrates an exemplary computing-based device in which embodiments of a depth detection apparatus and/or measurement pattern selector are implemented.

FIG. 10 illustrates various components of an exemplary computing-based device 1000 which is implemented as any form of a computing and/or electronic device, and in which embodiments of a depth detection apparatus and/or measurement pattern selector are implemented in some examples.

Computing-based device 1000 comprises one or more processors 1002 which are microprocessors, controllers or any other suitable type of processors for processing computer executable instructions to control the operation of the device in order to compute a stream of depth maps from a stream of frames of raw time-of-flight data (received from time-of-flight camera 1026) using temporal information, and/or to select measurement patterns for use by a time-of-flight camera which uses temporal information. In some examples, for example where a system on a chip architecture is used, the processors 1002 include one or more fixed function blocks (also referred to as accelerators) which implement a part of the method of FIG. 6 and/or FIG. 7 in hardware (rather than software or firmware). Platform software comprising an operating system 1004 or any other suitable platform software is provided at the computing-based device to enable application software 1006 to be executed on the device. A computation logic 1008 is provided which includes a model of temporal time-of-flight 1014 in some examples, and/or an efficient regressor which is a working equivalent of the model. The computation logic 1008 comprises a measurement pattern selector 1012 in some examples, where the computing-based device 1000 is used to select sequences of measurement patterns to be used by a temporal time-of-flight system. The computation logic has an inference component 1010 in some cases, which carries out inference on the model of temporal time-of-flight.

The computer executable instructions are provided using any computer-readable media that is accessible by computing based device 1000. Computer-readable media includes, for example, computer storage media such as memory 1016 and communications media. Computer storage media, such as memory 1016, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1016) is shown within the computing-based device 1000 it will be appreciated that the storage is, in some examples, distributed or located remotely and accessed via a network or other communication link (e.g. using communication interface 1018).

The computing-based device 1000 also comprises an input/output controller 1020 arranged to output display information to a display device 1024 which may be separate from or integral to the computing-based device 100. The display information optionally graphically presents depth maps computed by the computing-based device and in some cases provides a graphical user interface to enable a user to set parameters such as measurement patterns, the number of frames of raw sensor data S used in the temporal model, to specify empirical priors and for other purposes. The input/output controller 1020 is also arranged to receive and process input from one or more devices, such as time-of-flight camera 1026, a user input device 1022 (e.g. a mouse, keyboard, camera, microphone or other sensor). In some examples the user input device 1022 detects voice input, user gestures or other user actions and provides a natural user interface (NUI). This user input may be used to specify measurement patterns, specify parameters of the temporal time-of-flight model, specify parameters of the static time-of-flight model or for other purposes. In an embodiment the display device 1024 also acts as the user input device 1022 if it is a touch sensitive display device. The input/output controller 1020 outputs data to devices other than the display device in some examples, e.g. a locally connected printing device.

Any of the input/output controller 1020, display device 1024 and the user input device 1022 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A depth detection apparatus comprising:

a memory storing frames of raw time-of-flight sensor data received from a time-of-flight sensor, the frames having been captured by a time-of-flight camera in the presence of motion such that different ones of the frames were captured using different locations of the camera and/or with different locations of an object in a scene depicted in the frames;

a computation logic with functionality to compute a plurality of depth maps from the stream of frames, whereby each frame of raw time-of-flight sensor data contributes to more than one depth map.

The apparatus described above wherein the computation logic has functionality to carry out inference with respect to a model of temporal time-of-flight, which is a model describing how raw time-of-flight data is generated by the camera under imaging conditions comprising albedo, illumination and surface depth from the camera, and where the model describes how imaging conditions at individual pixels evolve over time.

The apparatus described above wherein the model of temporal time-of-flight comprises a weighted combination of a static model and a temporal model, the temporal model describing how imaging conditions at individual pixels evolve over time and the static model omitting data about evolution over time.

The apparatus described above wherein the functionality to carry out inference comprises a look-up table or regressor trained to be a practical working equivalent of the model of temporal time-of-flight.

The apparatus described above where the look up-table or regressor has been trained using training data generated by the model.

The apparatus described above wherein the model of temporal time-of-flight comprises a prior term expressing knowledge about a trajectory of the time-of-flight camera and about scene geometry.

The apparatus described above wherein the prior term has been empirically determined.

The apparatus described above where the memory stores the frames such that different ones of the frames have been captured using different measurement patterns of the time-of-flight camera, and where a sequence of measurement patterns used by the time-of-flight camera has been specified taking into account the model.

The apparatus described above wherein the computation logic is configured to operate in real time whereby a frame rate of the frames captured by the time-of-flight camera is matched or bettered by a rate at which the depth maps are output by the computation logic.

The apparatus described above wherein the computation logic is configured to output the depth maps at a rate of 30 per second or more.

An apparatus comprising:

a memory storing frames of raw time-of-flight sensor data received from a time-of-flight sensor, the frames having been captured by a time-of-flight camera in the presence of motion such that different ones of the frames were captured using different locations of the camera and/or with different locations of an object in a scene depicted in the frames;

a computation logic configured to compute a plurality of depth maps from the stream of frames by carrying out inference with respect to a model of temporal time-of-flight, which is a model describing how raw time-of-flight data is generated by the camera under imaging conditions comprising albedo, illumination and surface depth from the camera, and where the model describes how imaging conditions at individual pixels evolve over time.

The apparatus of described above integral with a time-of-flight camera.

The apparatus of described above integral with a mobile computing device.

A computer-implemented method comprising:

storing, at a memory, frames of raw time-of-flight sensor data received from a time-of-flight sensor, the frames having been captured by a time-of-flight camera in the presence of motion such that different ones of the frames were captured using different locations of the camera and/or with different locations of an object in a scene depicted in the frames;

computing a plurality of depth maps from the stream of frames, whereby each frame of raw time-of-flight sensor data contributes to more than one depth map.

The method described above wherein computing the depth maps comprises carrying out inference with respect to a model of temporal time-of-flight, which is a model describing how raw time-of-flight data is generated by the camera under imaging conditions comprising albedo, illumination and surface depth from the camera, and where the model describes how imaging conditions at individual pixels evolve over time.

The method described above wherein computing the depth maps comprises making a weighted combination of a static model and a temporal model, the temporal model describing how imaging conditions at individual pixels evolve over time and the static model omitting data about evolution over time.

The method described above wherein computing the depth maps comprises using a look-up table or regressor trained to be a practical working equivalent of a model of temporal time-of-flight.

The method described above comprising filling the look up-table or training the regressor using data generated by the model.

The method described above wherein the model of temporal time-of-flight comprises an empirical prior term expressing knowledge about a trajectory of the time-of-flight camera and about scene geometry.

The method described above comprising computing a sequence of measurement patterns to be used by the time-of-flight camera taking into account the model.

A computing device comprising means for storing, frames of raw time-of-flight sensor data received from a time-of-flight sensor, the frames having been captured by a time-of-flight camera in the presence of motion such that different ones of the frames were captured using different locations of the camera and/or with different locations of an object in a scene depicted in the frames; and means for computing a plurality of depth maps from the stream of frames, whereby each frame of raw time-of-flight sensor data contributes to more than one depth map The examples illustrated and described herein as well as examples not specifically described herein but within the scope of aspects of the disclosure constitute exemplary means for storing and exemplary means for computing a plurality of depth maps. For example, the computation logic illustrated in FIGS. 9 and 10, such as when encoded to perform the operations illustrated in FIG. 6 and/or FIG. 7 constitute exemplary means for computing a plurality of depth maps.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A depth detection apparatus comprising:
 a memory storing frames of raw time-of-flight sensor data received from a time-of-flight camera, the frames having been captured by the time-of-flight camera in the presence of motion such that different ones of the frames were captured using different locations of the camera or with different locations of an object in a scene depicted in the frames or with both different locations of the camera and different locations of an object in a scene depicted in the frames; and
 a hardware processor configured to perform computation logic to compute a plurality of depth maps from the frames of raw time-of-flight sensor data, whereby each frame of raw time-of-flight sensor data contributes to the computation of more than one depth map by using a block of the frames of raw time-of-flight sensor data to compute the more than one depth map, the hardware processor further configured to provide the plurality of depth maps to a system that uses the plurality of depth maps to determine depth information, wherein the computation logic has functionality to carry out inference with respect to a model of temporal time-of-flight, the model of temporal time-of-flight comprising a weighted combination of a static model and a temporal model, the temporal model describing how imaging conditions at individual pixels evolve over time and the static model omitting data about evolution over time.

2. The apparatus of claim 1 wherein the model of temporal time-of-flight describes how raw time-of-flight data is generated by the camera under imaging conditions comprising albedo, illumination and surface depth from the camera.

3. The apparatus of claim 2 where the model is a probabilistic model.

4. The apparatus of claim 3 wherein the model of temporal time-of-flight comprises a prior term expressing knowledge about a trajectory of the time-of-flight camera and about scene geometry.

5. The apparatus of claim 4 wherein the prior term has been empirically determined.

6. The apparatus of claim 2 wherein the functionality to carry out inference comprises a look-up table or regressor trained to be a practical working equivalent of the model of temporal time-of-flight.

7. The apparatus of claim 6 where the look up-table or regressor has been trained using training data generated by the model.

8. The apparatus of claim 1 where the memory stores the frames such that different ones of the frames have been captured using different measurement patterns of the time-of-flight camera, and where a sequence of measurement patterns used by the time-of-flight camera has been specified taking into account the model.

9. The apparatus of claim 1 wherein the computation logic is configured to operate in real time whereby a frame rate of the frames captured by the time-of-flight camera is matched or bettered by a rate at which the depth maps are output by the computation logic.

10. The apparatus of claim 1 wherein the computation logic is configured to output the depth maps at a rate of 30 per second or more.

11. An apparatus comprising:
 a memory storing frames of raw time-of-flight sensor data received from a time-of-flight camera, the frames having been captured by the time-of-flight camera in the presence of motion such that different ones of the frames were captured using different locations of the camera and/or with different locations of an object in a scene depicted in the frames; and
 a hardware processor configured to perform computation logic to compute a plurality of depth maps from the frames of raw time-of-flight sensor data by carrying out inference with respect to a model of temporal time-of-flight that uses each frame of raw time-of-flight sensor data to compute more than one depth map by using a block of the frames of raw time-of-flight sensor data, wherein the model of temporal time-of-flight comprises a weighted combination of a static model and a temporal model, the temporal model describing how imaging conditions at individual pixels evolve over time and the static model omitting data about evolution over time, where the model of temporal time-of-flight describes how raw time-of-flight data is generated by the camera under imaging conditions comprising albedo, illumination and surface depth from the camera, the processor further configured to provide the plurality of depth maps to a system that uses the plurality of depth maps to determine depth information.

12. The apparatus of claim 11 integral with a time-of-flight camera.

13. The apparatus of claim 11 integral with a mobile computing device.

14. A computer-implemented method comprising:
storing, at a memory, frames of raw time-of-flight sensor data received from a time-of-flight camera, the frames having been captured by the time-of-flight camera in the presence of motion such that different ones of the frames were captured using different locations of the camera or with different locations of an object in a scene depicted in the frames or with both different locations of the camera and different locations of an object in a scene depicted in the frames;
computing a plurality of depth maps from the frames of raw time-of-flight sensor data, whereby each frame of raw time-of-flight sensor data contributes to the computation of more than one depth map by using a block of the frames of raw time-of-flight sensor data to compute the more than one depth map, wherein computing the depth maps comprises carrying out inference with respect to a model of temporal time-of-flight and making a weighted combination of a static model and a temporal model, the temporal model describing how imaging conditions at individual pixels evolve over time and the static model omitting data about evolution over time; and
providing the plurality of depth maps to a system that uses the plurality of depth maps to determine depth information.

15. The method of claim 14 wherein the model describes how raw time-of-flight data is generated by the camera under imaging conditions comprising albedo, illumination and surface depth from the camera.

16. The method of claim 15 where the model is a probabilistic model.

17. The method of claim 14 wherein computing the depth maps comprises using a look-up table or regressor trained to be a practical working equivalent of a model of temporal time-of-flight.

18. The method of claim 17 comprising filling the look up-table or training the regressor using data generated by the model.

19. The method of claim 14 wherein the model of temporal time-of-flight comprises an empirical prior term expressing knowledge about a trajectory of the time-of-flight camera and about scene geometry.

20. The method of claim 14 comprising computing a sequence of measurement patterns to be used by the time-of-flight camera taking into account the model.

* * * * *